United States Patent [19]
Halle et al.

[11] Patent Number: 5,691,540
[45] Date of Patent: Nov. 25, 1997

[54] ASSEMBLY FOR MEASURING A TRENCH DEPTH PARAMETER OF A WORKPIECE

[75] Inventors: Scott D. Halle, Hopewell Junction; Philip Charles Danby Hobbs, Briarcliff Manor; Tadashi Mitsui, Wappingers Falls; Theodore G. van Kessel, Millbrook; Hemantha Kumar Wickramasinghe, Chappaqua, all of N.Y.

[73] Assignee: IBM Corporation, Armonk, N.Y.

[21] Appl. No.: 643,090

[22] Filed: Apr. 30, 1996

[51] Int. Cl.$^6$ ................................................ G01B 11/22
[52] U.S. Cl. ........................................ 250/372; 356/355
[58] Field of Search ........................ 250/372; 356/355, 356/357

[56] References Cited

U.S. PATENT DOCUMENTS

| | | | |
|---|---|---|---|
| 4,198,261 | 4/1980 | Busta et al. | 356/364 |
| 4,618,262 | 10/1986 | Maydan et al. | 356/357 |
| 4,660,979 | 4/1987 | Muething | 356/357 |
| 4,840,487 | 6/1989 | Noguchi et al. | 356/355 |
| 4,927,485 | 5/1990 | Cheng et al. | 356/355 |
| 5,087,121 | 2/1992 | Kakuchi et al. | 356/378 |
| 5,384,639 | 1/1995 | Wickramasinghe | 356/355 |
| 5,392,118 | 2/1995 | Wickramasinghe | 356/355 |
| 5,414,504 | 5/1995 | Litvak et al. | 356/72 |

*Primary Examiner*—Carolyn E. Fields
*Attorney, Agent, or Firm*—Stephen C. Kaufman; IBM Corporation

[57] ABSTRACT

An assembly for measuring a trench depth parameter of a workpiece is disclosed. The assembly has an ultra-violet radiation source; a split fiber bundle having a first branch for propagating the ultra-violet radiation from the radiation source to a lens, and a second branch; a lens for focusing the UV radiation to the workpiece and refocusing an ultra-violet interference signal to the second branch; and a detector responsive to the ultra-violet interference signal received through the second branch. The detector transforms the ultra-violet interference signal to an electrical signal which is a measure of a trench depth of the workpiece. The ultra-violet interference signal is developed when ultra-violet radiation propagates through the workpiece and reflects from its base region to thereby interfere with ultra-violet radiation that is directly reflected by a workpiece surface which is different from the base region.

6 Claims, 3 Drawing Sheets

5,691,540

1

ASSEMBLY FOR MEASURING A TRENCH DEPTH PARAMETER OF A WORKPIECE

FIELD OF THE INVENTION

The present invention relates to a novel assembly suitable for measuring a trench depth parameter of a workpiece.

BACKGROUND OF THE INVENTION

Apparatus and techniques suitable for optical radiation measurements of geometric structures defining a high aspect depth ratio, such geometric structures including isolation trenches or trench capacitors used in a fabrication of semi-conductor integrated circuits, or trench depth in an optical disk, are known. Instruction and background information on this subject may be found in U.S. Pat. Nos. 5,392,118; 4,618,262; 5,414,504; 4,660,979; or 4,198,261.

SUMMARY OF THE INVENTION

Our work comprises an extension of the applicability and the capability of trench depth measurement, and proceeds in particular from a consideration of the following critique of present and typical apparatus and technique that may be utilized for in-situ optical interferometric trench depth measurement. To develop this point, we first outline our objectives for a trench depth measurement capability, to thereby reference the deficiencies of the present technology.

Accordingly, our objectives or requirements for trench depth measurement include:

(1) An ability to measure features with a lateral dimension of e.g., sub 0.5 micron size.

(2) An ability to target a region of interest without requiring repositioning of a probe radiation beam.

(3) An ability to be insensitive to undesired environmental noise, for example, unwanted optical noise from plasma radiation generated by reactive ion etching (RIE) processes.

(4) An ability for rejecting etch chamber window reflections, and contaminations on a chamber window and lenses along the radiation path and external radiation.

The present technology cannot meet these objectives, and its deficiencies become manifest when set in apposition to our objectives.

In general, the wavelengths in visible laser optical interferometry are inherently too long, due to optical diffraction limitations, to be effective in measuring features with a lateral dimension of sub 0.5 micron size.

In particular, the limitations of laser optical interferometry may be ascertained in the following five ways. First, for shallow trench depths, both the feasibility of measurement and the accuracy of the etch depth may be limited by dearth of maxima and minima (constructive and destructive) interferometric signals. Second, the amplitude of an interferometric signal may be too small for etch depth determination at a lower range of the critical dimension (CD) size of trench widths. Third, the amplitude of the etch depth signal may be sensitive to positioning on a wafer surface (i.e., array versus field and kerf), and therefore may require expensive positioning and targeting equipment (e.g., video camera and X, Y translation stages). Fourth, since an interferometric signal may be sensitive to position, the etch depth signal may drift due to mechanical vibrations. Fifth, prior art systems may be unduly sensitive to unwanted optical noise from the plasma radiation generated by reactive ion etching processes, and

2 window reflection and contamination caused by etching and deposition within the etch chamber may frequently degrade or destroy system performance.

We have now discovered a novel assembly suitable for measuring a trench depth parameter of a workpiece. The novel assembly has the considerable advantage of meeting all of our objectives and requirements as articulated above, thereby extending trench depth measurement capabilities, and resolving or avoiding deficiencies and expenses of present techniques.

The novel assembly comprises:

(1) an ultra-violet radiation source;

(2) a means for propagating the ultra-violet radiation from the source to a lens;

(3) a lens for focusing the ultra-violet radiation to a workpiece, and refocusing an ultra-violet interference signal to a detector, the ultra-violet interference signal being developed when ultra-violet radiation propagates through the workpiece and reflects from its base region, to thereby interfere with ultra-violet radiation that is directly reflected by the workpiece surface; and (4) a detector responsive to the ultra-violet interference signal for transforming it to an electrical signal which is a measure of a trench depth of the workpiece.

As alluded to above, the novel assembly as defined can realize significant advantages. Primary, is an ability to measure the trench depth of features with a lateral dimension of sub 0.5 micron size. Further, the novel assembly is more reliable and accurate than present techniques, and incorporates wafer position independent and trench CD independent means for detecting the in-situ etch depth as a function of etch time.

BRIEF DESCRIPTION OF THE DRAWING

The invention is illustrated in the accompanying drawing, in which.

DETAILED DESCRIPTION OF THE INVENTION

Figure 1:
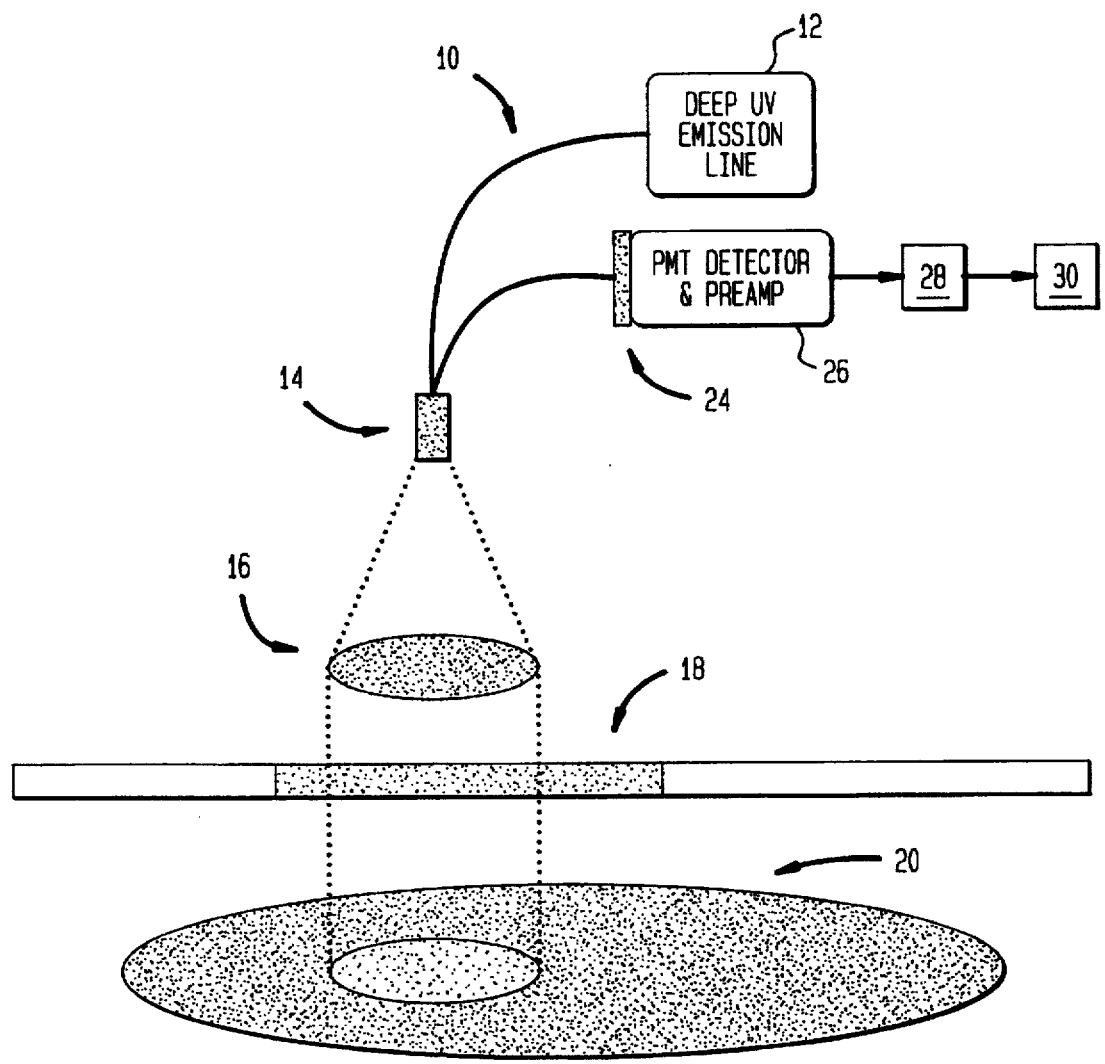
FIG. 1 is an illustration of a preferred embodiment of an assembly of the present invention.

Attention is now directed to FIG. 1, which shows a preferred embodiment of a novel assembly 10 suitable for measuring a trench depth parameter of a workpiece. In overview, the assembly 10 preferably includes seven conventional components which are now itemized.

The first component is an ultra-violet (UV) wavelength light source 12 which preferably comprises an intensity stable emission line source e.g., a deep ultra-violet monochromatic mercury arc lamp. Radiation from the radiation source 12 is preferably directed by component two which comprises a split UV fiber bundle 14, preferably comprising two branches of 25 fibers brought to a central core with approximately one millimeter diameter. (Note that in an alternative embodiment, not shown, a conventional lens/mirror system may be used in place of the UV transmission fiber.)

Figure 2:
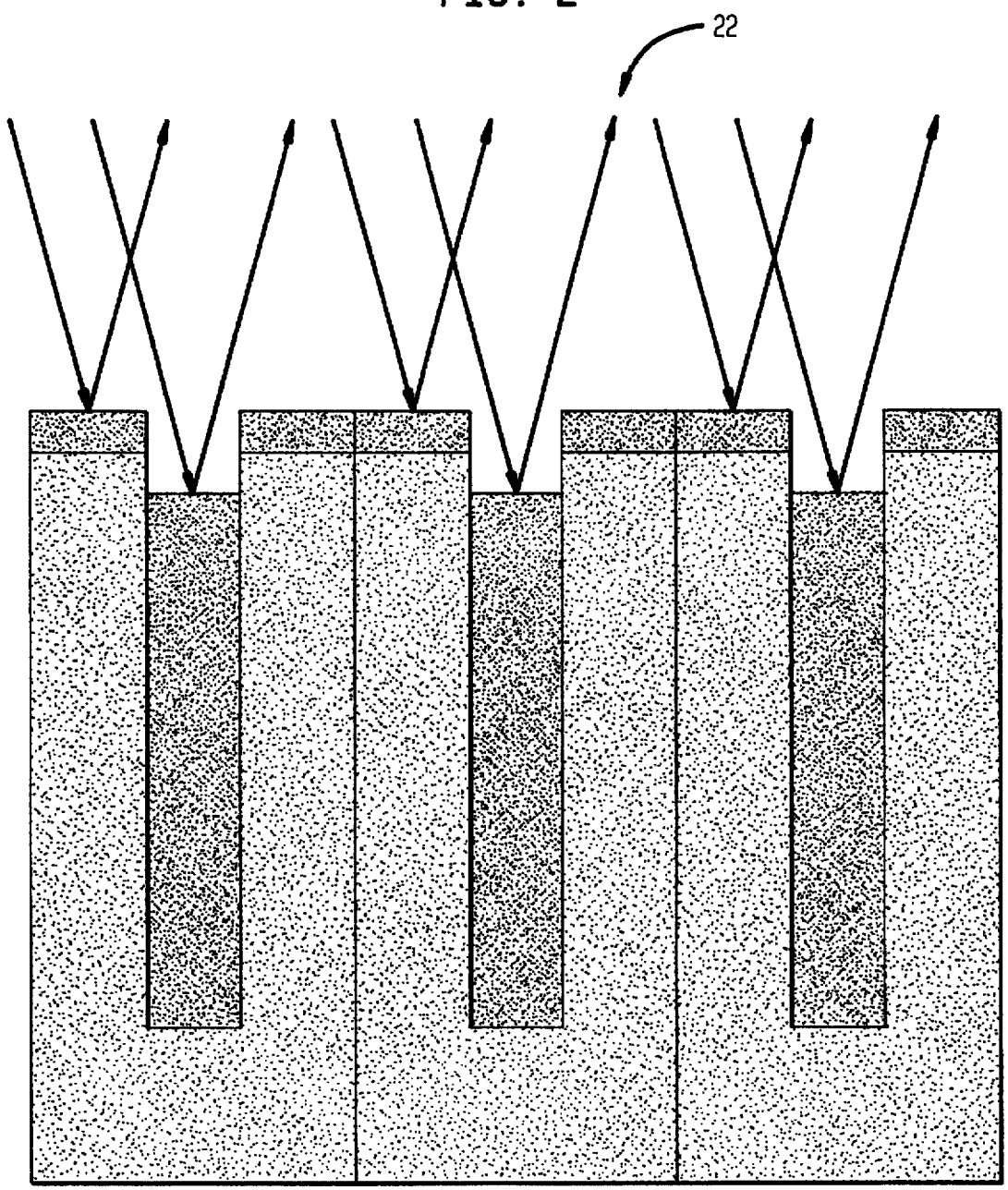
FIG. 2 shows how a trench depth measurement signal may be developed by the FIG. 1 assembly.

As shown in FIG. 1, UV radiation from one of the fiber bundle branches may be propagated to a third component, which preferably comprises a UV grade plano-convex lens and mount assembly 16. The lens mount assembly 16 can function in a two-fold manner. First, it can focus UV radiation through a quartz etch chamber window 18 to a silicon wafer 20 surface, the wafer having a deep, high aspect ratio trench depth e.g., 0.35 micron by 1.0 micron. The lens directed radiation can propagate through the wafer trench and reflect from the base region to interfere with radiation that is directly reflected by the wafer surface (see FIG. 2, numeral 22). This action can generate an interference signal (IS) which can propagate back through the quartz etch chamber window 18, to be refocused by the lens mount assembly 16 on the second of the two UV fiber bundle 14 branches.

From here, the interference signal may be processed in succession by the fourth through seventh components, namely, an emission line filter 24, a compact photo-multiplier detector 26 (including high voltage source preamplifier or, a UV sensitive semi-conductor detector/amplifier), an analog digital converter 28, and a data analysis computer system 30.

In operation, the detector 26 and pre-amp combination can produce an electrical signal in response to the UV interference signal, typically several volts during an etch. This analog signal may be digitized using the analog digital converter 28, and processed using the data analysis computer system 30 with suitable and known mathematical techniques, to compute trench depth from the observed signal i.e., estimating the number of sinusoidal interference fringes observed in the evolving ultra-violet interference signal during a known time period. In turn, this information may be used to control the trench etch process.

Note that the assembly 10 preferably defines a confocal optical system that preferably is focused to a spot on the surface of a planar substrate (workpiece) that is large in comparison to the region of interest being measured on the surface, such that the region is guaranteed to be within the radiation beam without requiring repositioning of the beam.

Figure 3:
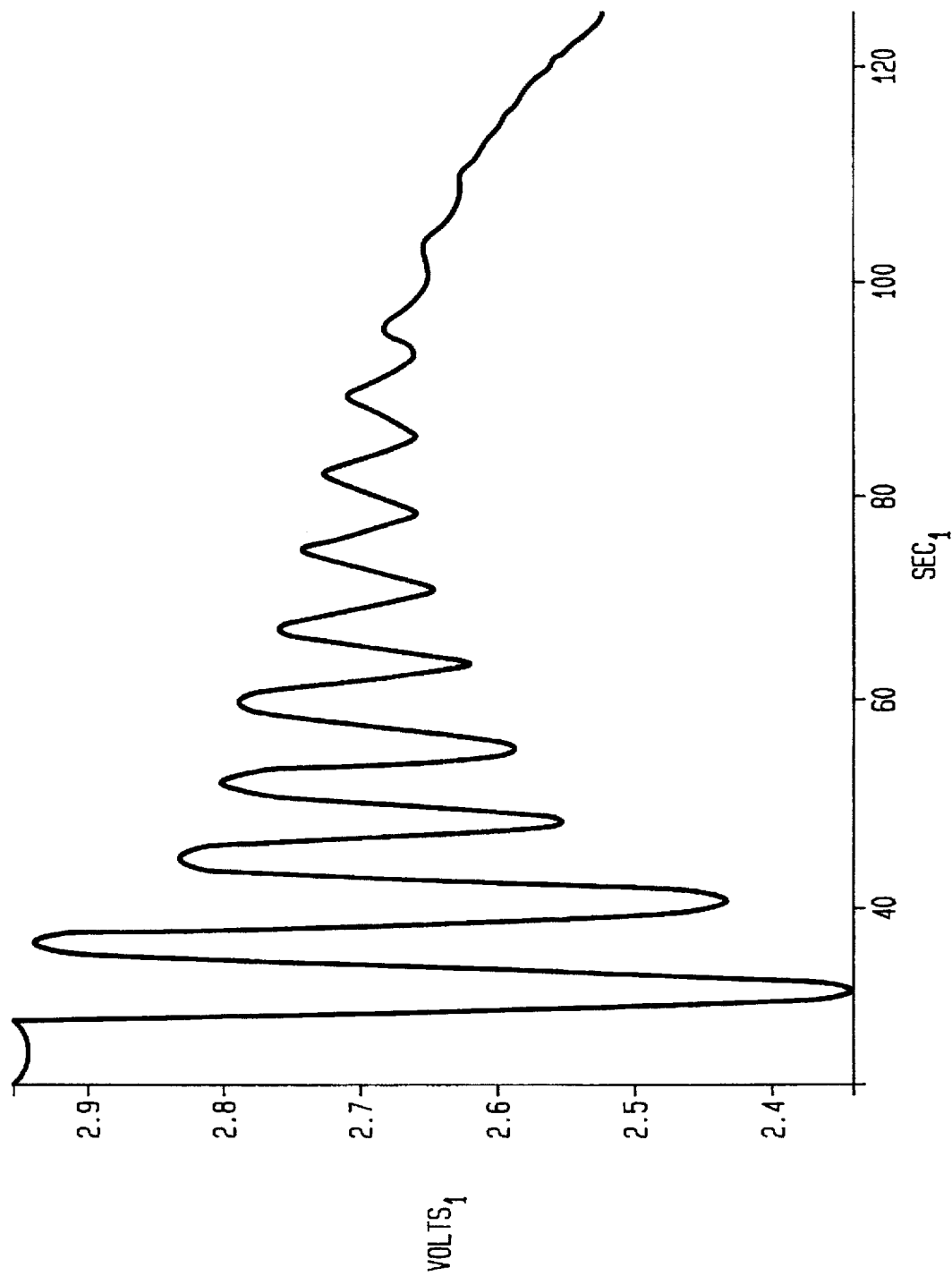
FIG. 3 shows a representative output UV interferometric signal for an RIE etch of polysilicon within a trench, as developed by a FIG. 1 type assembly.

The assembly 10 is compact and inexpensive, and can produce a strong noise-free signal (50:1 S/N or better). FIG. 3 shows a typical output of assembly 10 when measuring a recess RIE (reactive ion etching) etch of polysilicon to greater than 1.3 microns within the deep, high-aspect structure e.g., 0.3 microns by 1.5 microns. To illustrate, the assembly 10 can be similarly applied to polysilicon recess etching for levels ranging from 15 nanometers to deeper than 2 microns for approximately 0.25 micron lateral dimension trenches. Note also that the assembly 10 can be advantageously utilized for in-situ depth determination and etch process monitoring for etching applications such as chemical dry (downstream) etching (CDE) and wet etching, where said medium is optically conducting in the UV.

What is claimed:

1. An assembly comprising:

an ultra-violet radiation source;

a split fiber bundle having a first branch for propagating the ultra-violet radiation from the radiation source to a lens, and a second branch;

a lens for focusing the ultra-violet radiation to a workpiece and refocusing an ultra-violet interference signal to said split fiber bundle, the ultra-violet interference signal being developed when ultra-violet radiation propagates through said workpiece and reflects from its base region to thereby interfere with ultra-violet radiation that is directly reflected by a workpiece surface which is different from said base region; and a detector responsive to the ultra-violet interference signal received through said second branch, said detector transforming the ultra-violet interference signal to an electrical signal which is a measure of a trench depth of said workpiece.

2. An assembly according to claim 1, wherein the source comprises an intensity stable emission line source.

3. An assembly according to claim 2, wherein the source comprises a monochromatic mercury arc lamp.

4. An assembly according to claim 1, wherein the detector comprises a photo-multiplier.

5. An assembly according to claim 1, wherein the detector comprises a UV semiconductor device.

6. An assembly according to claim 1, further including a data analysis computer system connected to the detector for computing trench depth based on the electrical signal.

* * * * *